(12) United States Patent
Dry et al.

(10) Patent No.: US 10,899,251 B2
(45) Date of Patent: Jan. 26, 2021

(54) VEHICLE SEATING ASSEMBLY (71) Applicant: Ford Global Technologies, LLC, Deaborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/412,955

(22) Filed: May 15, 2019

(65) Prior Publication Data
US 2020/0361344 A1 Nov. 19, 2020

(51) Int. Cl.
| | |
|---|---|
| *A47C 7/74* | (2006.01) |
| *B60N 2/56* | (2006.01) |
| *B60N 2/16* | (2006.01) |
| *B60N 2/90* | (2018.01) |
| *F16K 31/42* | (2006.01) |
| *B60N 2/02* | (2006.01) |

(52) U.S. Cl.
CPC ......... *B60N 2/1665* (2013.01); *B60N 2/0248* (2013.01); *B60N 2/914* (2018.02); *F16K 31/423* (2013.01); *B60N 2002/0268* (2013.01)

(58) Field of Classification Search
CPC combination set(s) only.
See application file for complete search history.

(56) References Cited

U.S. PATENT DOCUMENTS

| | | | |
|---|---|---|---|
| 4,655,505 A | 4/1987 | Kashiwamura et al. | |
| 4,965,899 A * | 10/1990 | Sekido | B60N 2/665 297/284.6 |
| 5,082,326 A | 1/1992 | Sekido et al. | |
| 5,927,427 A * | 7/1999 | Sewell | B60N 2/002 180/273 |
| 6,014,784 A * | 1/2000 | Taylor | A61G 7/05776 297/284.6 |
| 6,092,249 A * | 7/2000 | Kamen | A47C 4/54 5/653 |
| 6,098,000 A | 8/2000 | Long et al. | |
| 6,273,810 B1 * | 8/2001 | Rhodes, Jr. | A47C 4/54 454/120 |
| 7,360,266 B2 * | 4/2008 | Kasatshko | A47C 4/54 297/452.41 |
| 9,211,824 B2 * | 12/2015 | Arant | B60N 2/62 |

(Continued)

FOREIGN PATENT DOCUMENTS

DE 3119867 A1 12/1982

*Primary Examiner* — Shin H Kim
(74) *Attorney, Agent, or Firm* — David L. Coppiellie; Price Heneveld LLP (57) ABSTRACT

A seating assembly is provided that includes a seat base operably coupled with a seatback. An air cell assembly is positioned within the seat base. The air cell assembly includes a first plurality of air cells. The first plurality of air cells includes a first thigh cell. The air cell assembly also includes a second plurality of air cells. The second plurality of air cells includes a second thigh cell. A first valve is operably coupled with the first plurality of air cells. A second valve is operably coupled with the second plurality of air cells. Each of the first and second valves is configured to control airflow to and from the first and second plurality of air cells, respectively.

18 Claims, 9 Drawing Sheets

(56) References Cited

U.S. PATENT DOCUMENTS

| | | | |
|---|---|---|---|
| 9,517,777 B2 * | 12/2016 | Hall | B60W 30/12 |
| 9,649,962 B2 | 5/2017 | Line et al. | |
| 9,937,826 B2 | 4/2018 | Dry | |
| 9,994,135 B2 | 6/2018 | Line et al. | |
| 10,214,129 B2 * | 2/2019 | Jaranson | B60N 2/914 |
| 2003/0030319 A1 * | 2/2003 | Clapper | B60N 2/914 |
| | | | 297/452.41 |
| 2003/0038517 A1 * | 2/2003 | Moran | B60N 2/914 |
| | | | 297/284.3 |
| 2005/0137506 A1 * | 6/2005 | Chow | A61H 9/0078 |
| | | | 601/149 |
| 2007/0158981 A1 * | 7/2007 | Almasi | B60N 2/5614 |
| | | | 297/180.12 |
| 2007/0246975 A1 * | 10/2007 | Bier | B60N 2/5621 |
| | | | 297/180.1 |
| 2008/0129089 A1 * | 6/2008 | Krobok | B60N 2/976 |
| | | | 297/180.13 |
| 2008/0136237 A1 * | 6/2008 | Kayumi | B60N 2/914 |
| | | | 297/284.9 |
| 2013/0285426 A1 * | 10/2013 | Arant | B60N 2/665 |
| | | | 297/284.1 |
| 2015/0061346 A1 * | 3/2015 | Featherstone | A47C 7/14 |
| | | | 297/452.41 |
| 2015/0091340 A1 * | 4/2015 | Hulway | B60N 2/5621 |
| | | | 297/180.14 |
| 2016/0046207 A1 * | 2/2016 | Arant | B60N 2/72 |
| | | | 297/284.6 |
| 2016/0129815 A1 * | 5/2016 | Kolich | B60N 2/865 |
| | | | 297/391 |
| 2018/0325264 A1 * | 11/2018 | Gallagher | A47C 7/74 |
| 2019/0351787 A1 * | 11/2019 | Lodhia | B60N 2/0244 |
| 2020/0139868 A1 * | 5/2020 | Ceglarek | B60N 2/976 |

* cited by examiner

VEHICLE SEATING ASSEMBLY

FIELD OF THE DISCLOSURE

The present disclosure generally relates to a vehicle seating assembly, and more specifically to an air cell assembly for a vehicle seating assembly.

BACKGROUND OF THE DISCLOSURE

Vehicle seats often need to be adjusted to accommodate occupants of various statures. For example, the fifth percentile female and/or the ninety-fifth percentile male may require different seating dimensions than the fiftieth percentile male.

SUMMARY OF THE DISCLOSURE

According to one aspect of the present disclosure, a seating assembly is provided that includes a seat base operably coupled with a seatback. An air cell assembly is positioned within the seat base. The air cell assembly includes a first plurality of air cells including a first thigh cell, and a second plurality of air cells including a second thigh cell. A first valve is operably coupled with the first plurality of air cells. A second valve is operably coupled with the second plurality of air cells. Each of the first and second valves is configured to control airflow to and from the first and second plurality of air cells, respectively. A cable is operably coupled to the first thigh cell and operably coupled with the seatback. The cable is configured to selectively compress the first thigh cell.

Embodiments of this aspect of the disclosure can include any one or a combination of the following features:
- the first and second plurality of air cells each being movable between an expanded state and a contracted state;
- the first and second plurality of air cells including a fill material configured to bias the first and second plurality of air cells in the expanded state;
- the seatback being operable between a raised position and a lowered position, wherein the cable biases the first thigh cell in a contracted state when the seatback is in the lowered position;
- the first and second valves being coupled with the first and second plurality of air cells, respectively, by inlet tubes and exhaust tubes; and/or
- the first and second valves being in an open position when the air cells move from the expanded state to the contracted state, wherein the first and second valves prevent airflow when the first and second valves are in a closed position.

According to another aspect of the present disclosure, a seating assembly is provided that includes a seat base operably coupled with a seatback. An air cell assembly is positioned within the seat base. The air cell assembly includes a plurality of air cells including a thigh cell. A valve is operably coupled with the plurality of air cells. A pump is operably coupled with the plurality of air cells and the valve. The valve is configured to control airflow from the pump to and from the plurality of air cells. A controller is configured to detect an occupant and actuate the pump.

Embodiments of this aspect of the disclosure can include any one or a combination of the following features:
- the valve being a three-way valve, wherein the pump is configured to provide airflow to and from the plurality of air cells through the valve;
- airflow being inhibited when the valve is closed;
- the plurality of air cells being one of multiple pluralities of air cells, wherein each of the multiple pluralities of air cells is independently expanded and contracted;
- the plurality of air cells including a fill material configured to bias each of the plurality of air cells in an expanded state;
- the seating assembly further including a sensor configured to determine a height of a vehicle occupant, wherein the sensor provides input to the control for providing routine to the pump and valve for adjusting inflation of the plurality of air cells; and/or
- the seating assembly further including a switch positioned proximate the seat base and configured to provide input to the controller for providing a routine to the pump and valve for adjusting inflation of the plurality of air cells.

According to another aspect of the present disclosure, a seating assembly is provided that includes a seat base operably coupled with a seatback. A first plurality of air cells is positioned within the seat base. A second plurality of air cells is also positioned within the seat base. Each of the first plurality of air cells and the second plurality of air cells is movable between an expanded state and a contracted state. A first valve is operably coupled with the first plurality of air cells. A second valve is operably coupled with the second plurality of air cells. Each of the first and second valves is configured to control airflow to and from the first and second plurality of air cells, respectively Embodiments of this aspect of the disclosure can include any one or a combination of the following features:
- the seating assembly further including a first pump operably coupled with the first valve and configured to provide inflow and outflow of air through the first valve and a second pump operably coupled with the second valve and configured to provide inflow and outflow of air through the second valve;
- each of the first and second valves is operably coupled within an inlet line and exhaust line of one of the first and second plurality of air cells, respectively;
- the seating assembly further including a controller operably coupled with one of the first valve and the second valve, and a sensor configured to detect a size of an occupant, wherein the sensor provides input to the controller for providing a routine to the respective valve for allowing inflation of the respective plurality of air cells;
- the seating assembly further including a controller operably coupled with one of the first valve and the second valve and a switch positioned proximate the seat base, wherein the switch provides input to the controller for providing a routine to the respective valve for allowing inflation of the respective plurality of air cells;
- each air cell of the first and second plurality of air cells including a self-expanding fill material configured to bias each air cell in the expanded state; and/or
- a weight of an occupant providing an external pressure to compress the fill material and expel air from the respective air cell.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figures 1, 2:
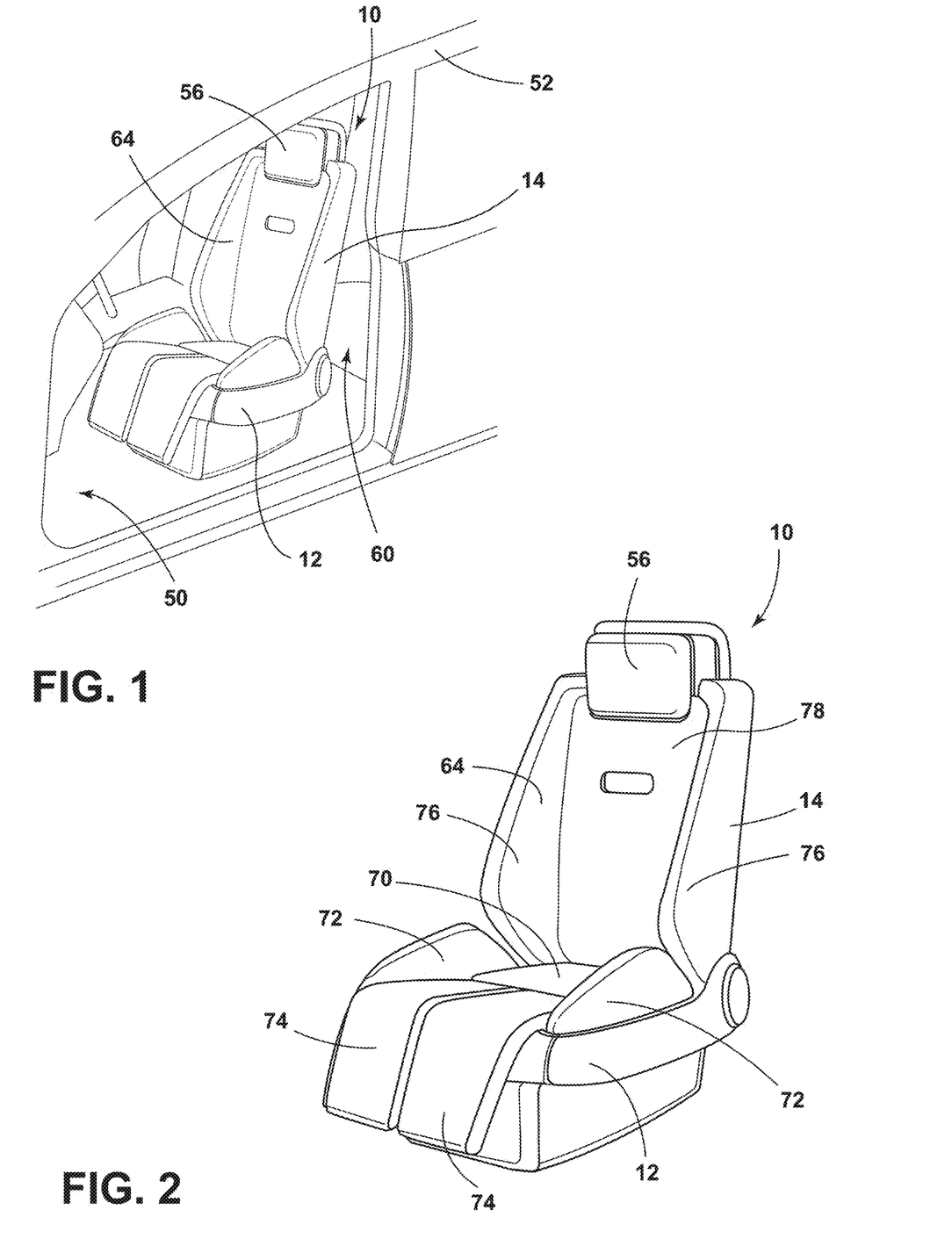
FIG. 1 is a top perspective view of a vehicle seating assembly within a vehicle, according to various examples.
FIG. 2 is an enlarged side perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates a seating assembly. The seating assembly 10 may include a seat base 12 operably coupled with a seatback 14. An air cell assembly 18 is positioned within the seat base 12. The air cell assembly 18 may include a first plurality of air cells 20. The first plurality of air cells 20 may include a first thigh cell 22. The air cell assembly 18 may also include a second plurality of air cells 24. The second plurality of air cells 24 may include a second thigh cell 26. Further, each of the first and second plurality of air cells 20, 24 may include individual air cells 34. A first valve 28 may be operably coupled with the first plurality of air cells 20. A second valve 30 may be operably coupled with the second plurality of air cells 24. Each of the first and second valves 28, 30 is configured to control airflow to and from the first and second plurality of air cells 20, 24, respectively.

Referring now to FIGS. 1 and 2, the illustrated seating assembly 10 is disposed within a front portion 50 of a vehicle 52. The seating assembly 10 includes the seat base 12 and the seatback 14. A headrest assembly 56 may be coupled to the seatback 14. The headrest assembly 56 may be movable to provide support for the head of an occupant for purposes of comfort during ordinary use and/or restraining support for the head of the occupant in the event of abrupt movement or the like. It is contemplated that the vehicle 52 may be any type of vehicle, such as a car, a truck, a van, etc. It is also contemplated that the concept set forth in this disclosure may be utilized in the front portion 50 of the vehicle 52, as well as the rear portion 60 of the vehicle 52, depending on the configuration of the vehicle 52.

Referring now to FIG. 2, the seating assembly 10 is illustrated having a cover 64 that is contemplated to be comprised of a suitable natural or synthetic material, or any combination thereof, that is used to generally cover or upholster the seating assembly 10. In various examples, each of the seat base 12 and the seatback 14 may have a separate cover 64a, 64b that is separately positioned from other covers 64 of the seating assembly 10 (see FIGS. 5A and 5B).

Still referring to FIG. 2, the seat base 12 may include a center region 70 configured to support a majority of the weight of an occupant of the seating assembly 10. The seat base 12 may further include side bolster regions 72 positioned on opposite sides of the center region 70. The side bolster regions 72 may be elevated relative to the center region 70 to aid in centering of an occupant within the seating assembly 10. Similarly, the seatback 14 includes back bolster regions 76 positioned on opposite sides of a central region 78 of the seatback 14. The back bolster regions 76 may extend outward and in a vehicle forward direction. Thigh bolster regions 74 may be positioned on a side of the seat base 12 opposite the seatback 14. The thigh bolster regions 74 may be configured to elevate or raise an occupant's legs to increase the comfort of the occupant and to appropriately position the occupant in the seating assembly 10.

Referring now to FIGS. 2-5B, the air cell assembly 18 may be positioned within the seat base 12 of the seating assembly 10 such that the first and second thigh cells 22, 26 are aligned with the thigh bolster regions 74. Generally, each of the air cells 34 of the air cell assembly 18 are supported between a frame (not shown) and a cushion 88 and/or the cover 64 of the seat base 12. The cushion 88 may be any cushion usable within the seat base 12 including any material used for cushions 88 within a vehicle seating assembly 10 without departing from the scope of the present disclosure.

Figure 3A:
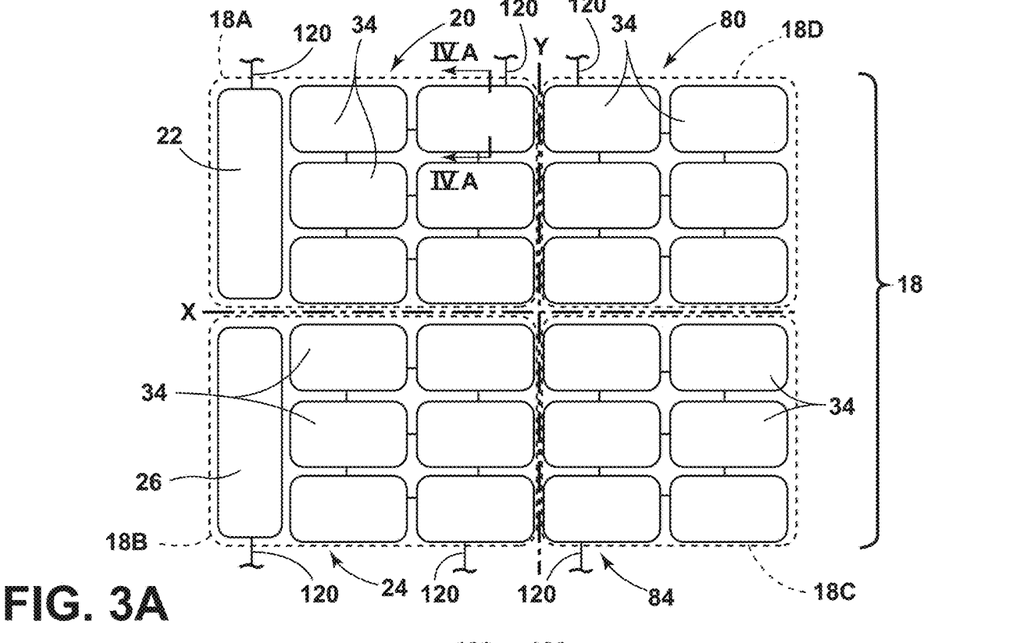
FIG. 3A is a schematic top plan view of an air cell assembly within a vehicle seating assembly with the air cell assembly in a first state, according to various examples.
Figure 3B:
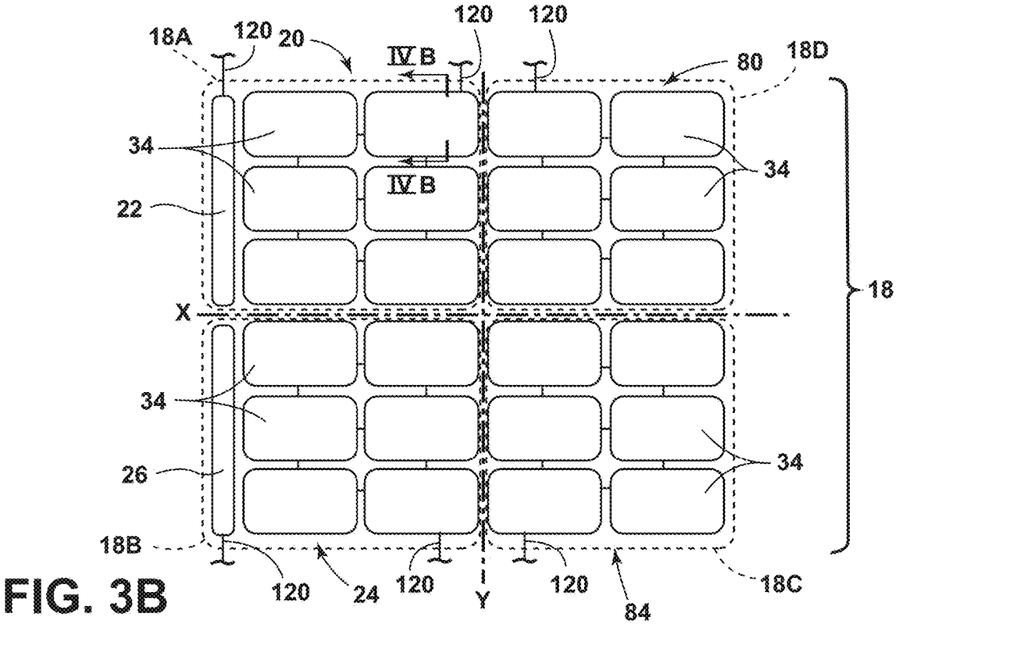
FIG. 3B is a schematic top plan view of an air cell assembly within a vehicle seating assembly with the air cell assembly in a second state, according to various examples.

As shown in FIGS. 3A and 3B, the air cell assembly 18 is generally divided into four support areas. Specifically, the air cell assembly 18 includes a first forward seat support area 18A, a second forward seat support area 18B, a first rearward support area 18C, and a second rearward support area 18D. The first forward seat support area 18A and the first rearward support area 18C may be positioned on a first side of a longitudinal central axis X of the air cell assembly 18, while the second forward seat support area 18B and the second rearward seat support area 18D may be positioned on a second, opposing side of the longitudinal central axis X. Likewise, the first and second forward seat support areas 18A, 18B may be positioned on a first side of a lateral central axis Y of the air cell assembly 18, while the first rearward seat support area 18C and the second rearward seat support area 18D may be positioned on a second, opposing side of the lateral central axis Y.

Each seat support area 18A, 18B, 18C, and 18D may include a plurality of air cells 20, 24, 80, 84. The seat support area 18A may include the first plurality of air cells 20 including the first thigh cell 22 and various individual air cells 34, and the seat support area 18B may include the second plurality of air cells 24 including the second thigh cell 26 and various individual air cells 34. Likewise, the seat support area 18C may include a third plurality of air cells 80 including various individual air cells 34, and the seat support area 18D may include a fourth plurality of air cells 84 including various air cells 34. This configuration ensures that, when the air cell assembly 18 receives the weight of an occupant, air inside the air cells 20, 24, 80, 84 is not distributed to the extremities of the air cell assembly 18, but rather, because of the division of the air cell assembly 18 into the various pluralities of air cells 20, 24, 80, 84 within the seat support areas 18A, 18B, 18C, and 18D, relative pressures in the air cell assembly 18 can be maintained. Although 26 total air cells 34 are shown within the air cell assembly 18, it will be understood that more or fewer air cells 34 could also be used to provide the necessary support and seat height without departing from the scope of the present disclosure.

Figure 4A:
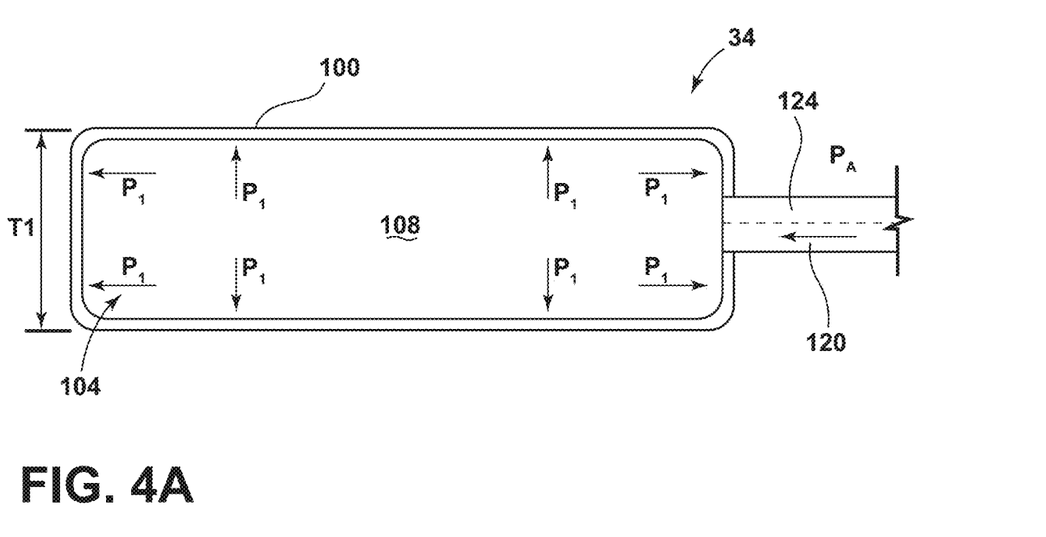
FIG. 4A is a schematic cross-sectional view of a single air cell of an air cell assembly in a first state taken along line IV-IV of FIG. 3A including an inlet/outlet line, according to various examples.
Figure 4B:
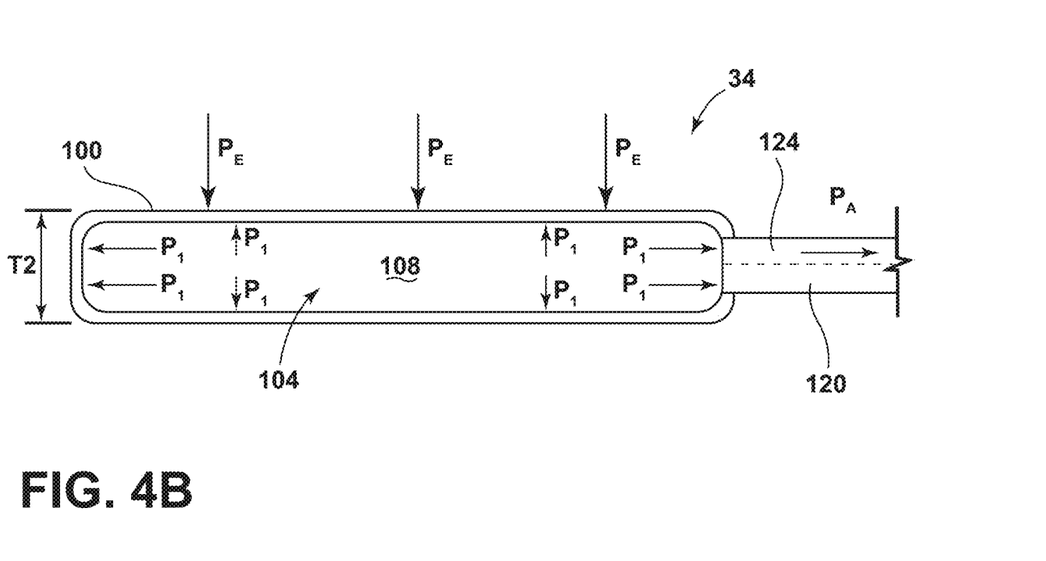
FIG. 4B is a schematic cross-sectional view of a single air cell of an air cell assembly in a second state taken along line IV-IV of FIG. 3B including an inlet/outlet line, according to various examples.
Figure 5A:
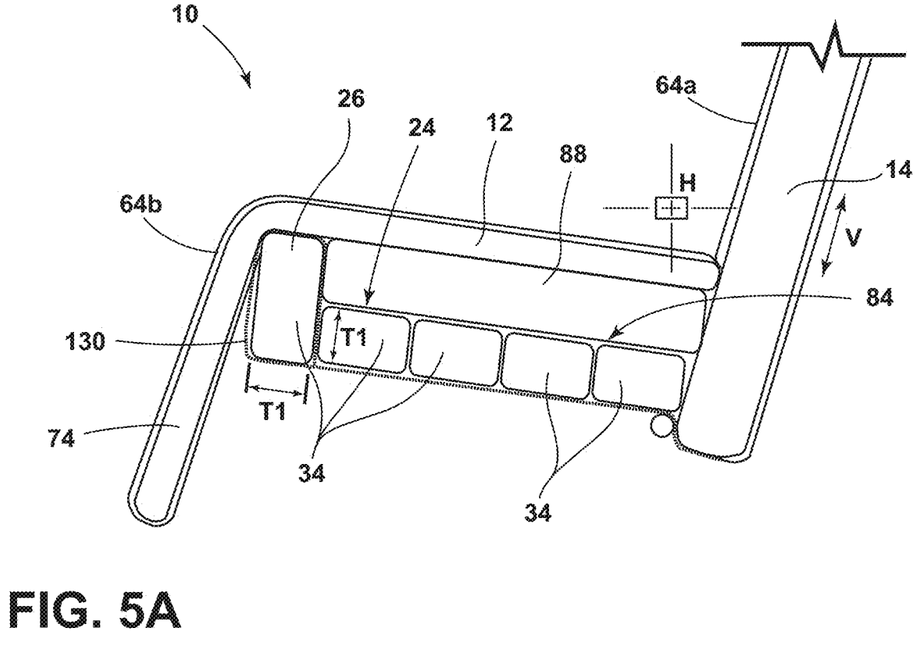
FIG. 5A is a schematic view of an air cell assembly with a vehicle seating assembly with the air cell assembly in a first state, according to various examples.
Figure 5B:
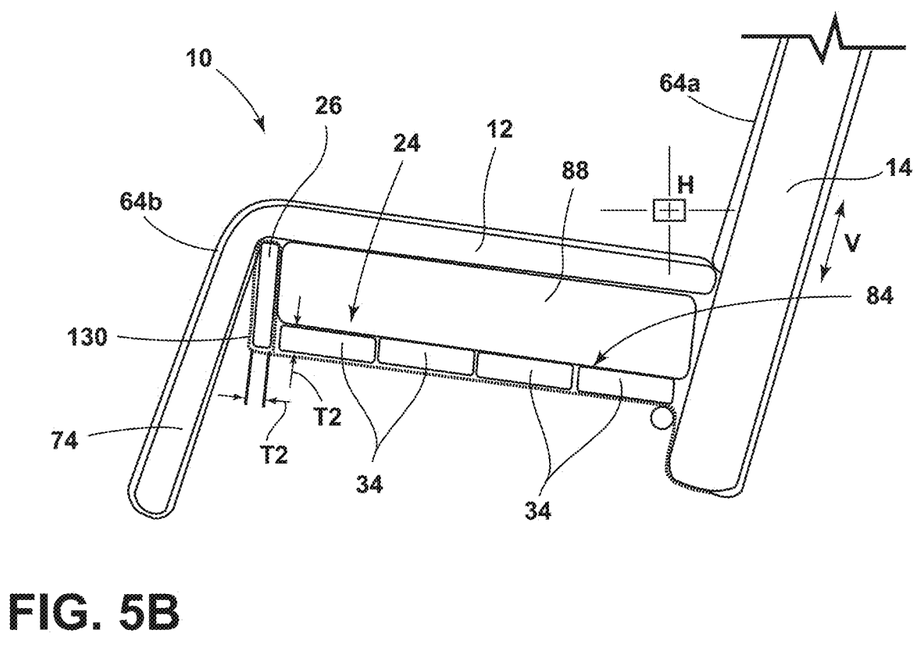
FIG. 5B is a schematic view of an air cell assembly with a vehicle seating assembly with the air cell assembly in a second state, according to various examples.

Each of the air cells 34 of the air cell assembly 18, may be operable between a fully expanded state (FIGS. 3A, 4A, and 5A) and a fully contracted state (FIGS. 3B, 4B, and 5B). As shown in FIGS. 3A-5B, the air cells 34 of each of the pluralities of air cells 20, 24, 80, 84 are each configured to expand with air or any other fluid to a desired level in response to an input from the occupant (e.g., input from a weight sensor activated by the vehicle occupant, input from a manual switch, input from a height sensor, direct input from weight, etc.), as discussed in more detail elsewhere herein. In this way, the air cells 34 are configured to selectively expand or contract relative to a specific support setting in order to provide a customized support setting for the seating assembly 10.

Referring now to FIGS. 4A and 4B, each air cell 34 may include an outer casing 100 that surrounds an interior cavity 104 in which fill material 108 is enclosed. The outer casing 100 may be composed of a polymeric and/or elastomeric liner. The outer casing 100 may be airtight, such that air may not permeate across the outer casing 100 of the air cell 34. According to various examples, the outer casing 100 may be configured to expand, or stretch, when expanded. Air pressure within the interior cavity 104 of the air cell 34 may expand the air cell 34 (e.g., to the expanded state of FIGS. 3A, 4A, and 5A) to a predetermined size and provide the seat base 12 a predetermined height and/or thickness, as discussed in more detail elsewhere herein.

Still referring to FIGS. 4A and 4B, a fill material 108 is positioned within the interior cavity 104 of the air cell 34. The fill material 108 may have a shape substantially similar to that of the air cell 34. For example, the fill material 108 may have a generally rectangular cross-sectional shape when viewed from above (FIGS. 3A and 3B). Where the fill material 108 is used within the first and second thigh air cells 22, 26, the fill material 108 may have a shape substantially similar to the thigh bolster regions 74 (FIGS. 5A and 5B). The fill material 108 may be configured to be compressed to a compacted state, which results in the contracted state of the air cell 34. The fill material 108 may further be configured to recover, or expand, to a size and shape substantially similar to that before the fill material 108 was compressed to move the air cell 34 back to the expanded state. The fill material 108 may be composed of a polyurethane material that is sensitive to pressure and temperature (e.g., a memory foam), an elastomeric foam, an expanded polystyrene, an expanded polypropylene, polymeric materials, composite materials and/or combinations thereof. The fill material 108 may have a closed-cell and/or open-cell configuration.

Each individual air cell 34 of each plurality of air cells 20, 24, 80, 84, including the first and second thigh cells 22, 26, may include an inlet line 120 extending therefrom to allow a supply of air for inflation thereof. Each inlet line 120 may be in the form of tubes of polymeric material or the like directly coupled with a portion of the outer casing 100 of the respective air cell 34. In various examples, each individual air cell 34 may further include an outlet line 124 extending therefrom to allow an escape of air for deflation thereof. The outlet line 124 may likewise be in the form of tubes of polymeric material or the like directly coupled with a portion of the outer casing 100 of the respective air cell 34. In other examples, the inlet line 120 may be a primary line 120 configured to act as the inlet line 120 and the outlet line 124 for the respective air cell 34.

Referring still to FIGS. 4A-5B, the expanded state of the air cell 34 may be selected to provide a first selected thickness T1 for the air cell 34. Similarly, the contracted state of the air cell 34 may be selected to provide a second selected thickness T2 for the air cell 34. Various states between the fully expanded state and the fully contracted states may be achieved by partially inflating or deflating the air cell 34 to provide any other predetermined thickness that is less than the first thickness T1 and greater than the second thickness T2.

Referring now to FIGS. 5A and 5B, the thigh bolster regions 74 may align with the first and second thigh cells 22, 26 of the air cell assembly 18. Each of the first and second thigh cells 22, 26, like the other air cells 34 of the air cell assembly 18, may be movable between an expanded state (FIGS. 3A and 4A) and a contracted state (FIGS. 3B and 4B). In the expanded state, the respective thigh cell 22, 26 may aid in providing a desired support or design to the seat base 12. For example, while expanded the thigh cells 22, 26 may maintain the thigh bolster region 74 at a predetermined height and configuration to maintain the hip pivot point of the occupant of the seating assembly 10 as well as provide comfort and support. Transition of the thigh cells 22, 26 from the expanded state to the contracted state may cause a decrease in thickness of the thigh bolster regions 74 from a first thickness T1 to a second thickness T2.

The thigh bolster region 74 and seat base 12 are configured to position the occupant of the seating assembly 10, such that a proper hip pivot point is established. The hip pivot point, referred to as h-point H, is the location of the occupant's hip, when seated in the seating assembly 10, relative to a floor pan of the vehicle 52 (or to the height above the pavement level). A proper h-point H may be different based on height and weight of the occupant. Using the thigh cells 22, 26 and the air cells 34 of the seat base 12 allows various h-points H to be accommodated as the seat base 12 and thigh bolster region 74 each adjust based on input regarding the occupant's height and weight, as discussed in more detail elsewhere herein.

Referring still to FIGS. 5A and 5B, in various examples, each thigh cell 22, 26 may be operably coupled with a cable 130. The cable 130 may further be coupled with the seatback 14. The seatback 14 may be movable between a raised position (FIG. 5A) and a lowered position (FIG. 5B) along arrow V. The positioning of the seatback 14 may be determined by a height sensor and may be automated. Alternatively, the positioning of the seatback 14 may be determined by the positioning of the seat base 12 as determined by input from the occupant to adjust the seating assembly 10. When the seatback 14 is in the raised position, the cable 130 may be in a neutral state. When the seatback 14 moves into the lowered position, tension may be applied to the cable 130. When tension is applied to the cable 130, the cable 130 may be configured to compress the outer casing 100 of the respective thigh cell 22, 26 such that air is expelled from the thigh cell 22, 26 and the thigh cell 22, 26 moves into the contracted state. It will be understood that the cable 130 may be any cable system configured to translate tension without departing from the scope of the present disclosure.

Referring again to FIGS. 2-5B, the fill material 108 may be configured to expand the outer casing 100 of the air cell 34 the expanded state. In other words, the fill material 108 may recover in size once compressed, such that the fill material 108 is the driving force to transition the air cell 34 from the contracted state to the expanded state. In use, the fill material 108 of the air cell 34 may be compressed when an occupant is seated in the seating assembly 10. The weight of the occupant is configured to compress the fill material 108 to a predetermined state to achieve a selected thickness, as discussed in more detail elsewhere herein. According to various examples, the fill material 108 may be configured to have a compression strength such that the fill material 108 is configured to compress a certain degree based on the weight of the occupant.

The fill material 108 may begin to expand, or recover, to its initial shape and size as the weight of the occupant is removed from the fill material 108. Such recovery of the fill material 108 provides a force against the outer casing 100 to draw air into the air cell 34 and transition the air cell 34 back to the expanded state. Inflation of the air cell 34 may cause the height of the seat base 12 to return to a predetermined or design height. Once the air cells 34 of the plurality of air cells 20, 24, 80, 84 have returned to the expanded state, the respective valve 28, 30, 140, 142 of each plurality of air cells 20, 24, 80, 84 is closed such that the air cell 34 is sealed. Sealing of the air cell 34 allows the seat base 12 and/or the thigh bolster regions 74 to become resilient and aid in maintaining the h-point H of an occupant of the seating assembly 10.

When one of the air cells 34 of one of the plurality of air cells 20, 24, 80, 84 is expanded, the air cell 34 may push outwardly on the structure that overlies it (e.g., the cushion 88 of the seat base 12) in the area immediately overlying such a cell, thereby causing a corresponding portion of seat base 12 to raise. Similarly, deflation of the air cell 34 of one of the plurality of air cells 20, 24, 80, 84 causes the cell 34 to return to a relatively thinner configuration such that the structure that overlies it (e.g., the cushion 88 of the seat base 12) recedes or lowers. Accordingly, the aforementioned areas 18A, 18B, 18C, 18D of the air cell assembly 18 can generally correspond to areas of the seat base 12 that overlie at the respective plurality of air cells 20, 24, 80, 84.

Figure 6:
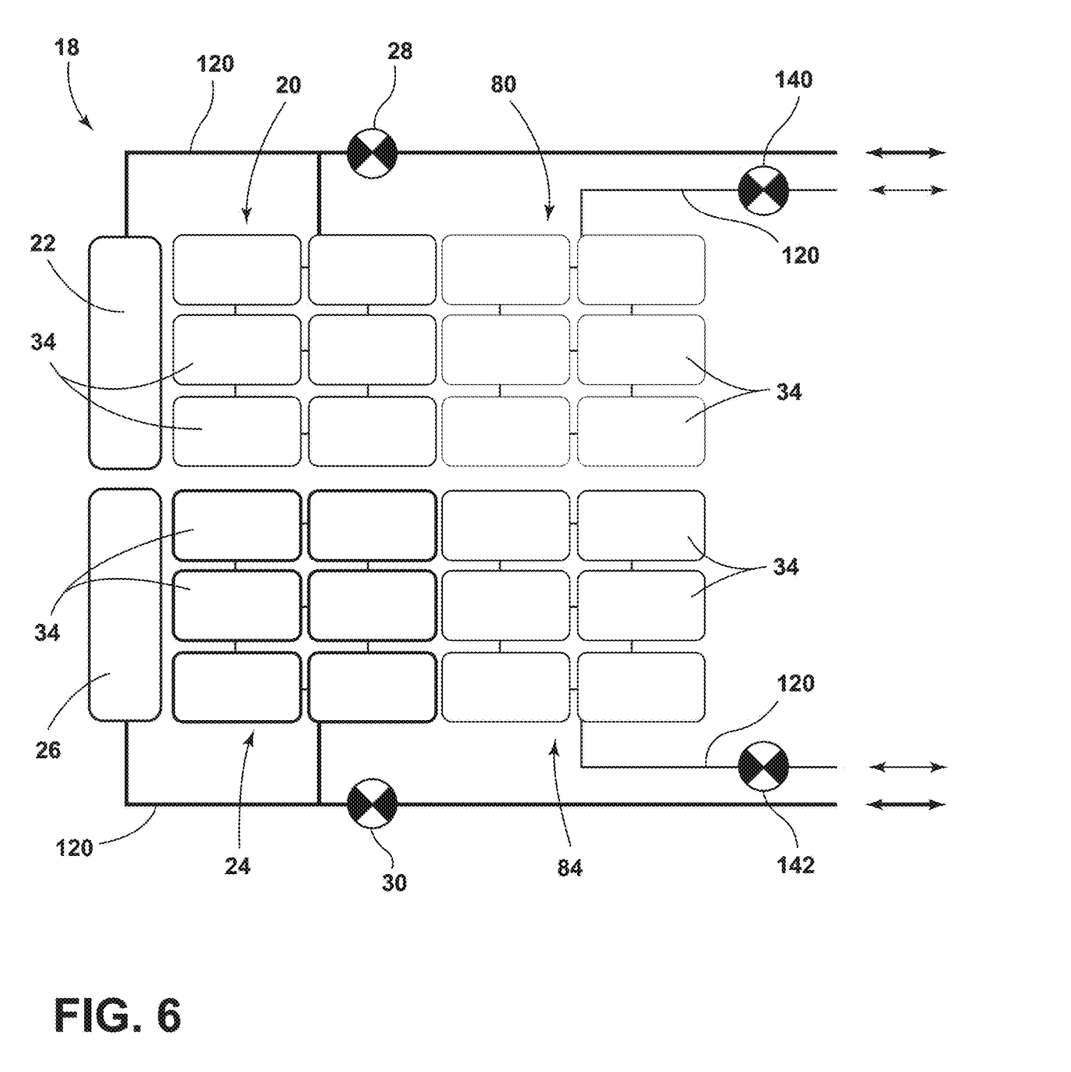
FIG. 6 is a schematic diagram of an air cell assembly having two-way valves, according to some examples.
Figure 7A:
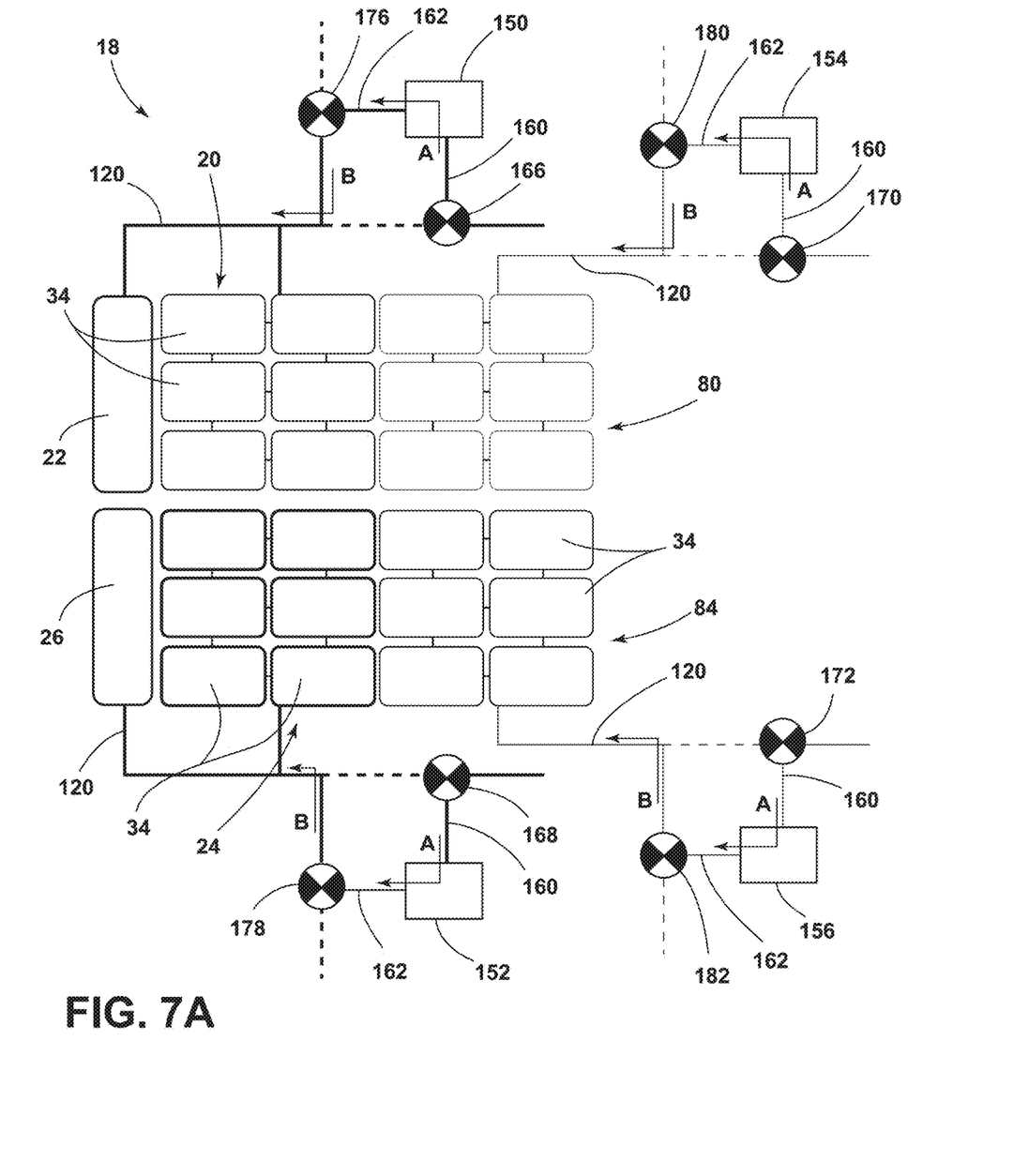
FIG. 7A is a schematic diagram of an air cell assembly having three-way valves positioned to expand the air cell assembly, according to some examples.
Figure 7B:
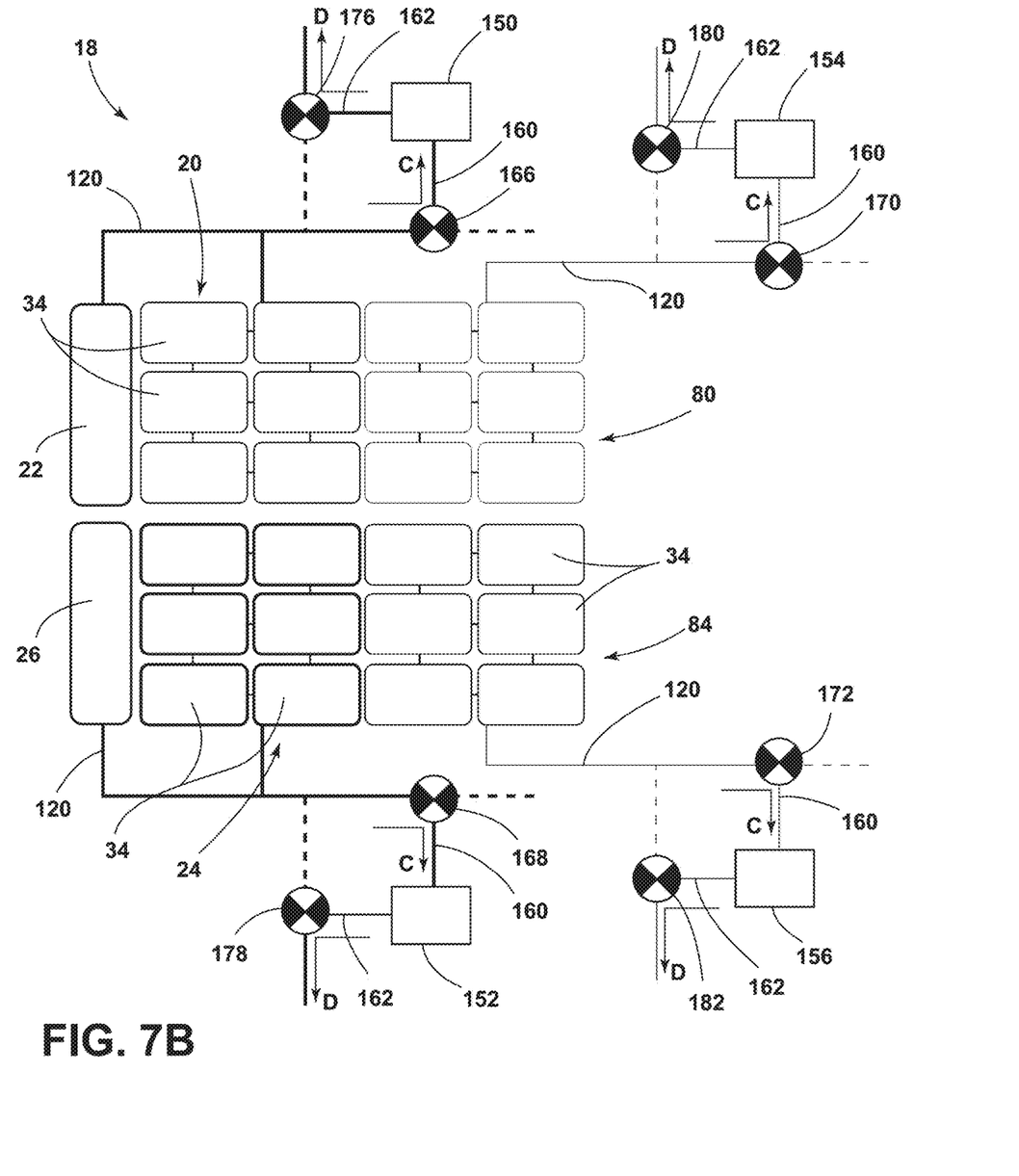
FIG. 7B is a schematic diagram of the air cell assembly of FIG. 7A having the three-way valves positioned to contract the air cell assembly, according to some examples.

Referring now to FIGS. 6-7B, the air cells 34 of each plurality of air cells 20, 24, 80, 84 may be interconnected in such a way that free exchange of air is provided from one air cell 34 of the respective plurality of air cells 20, 24, 80, 84 to another air cell 34 of the same plurality of air cells 20, 24, 80, 84. As illustrated in FIG. 6, a number of valves 28, 30, 140, 142 may be provided for controlling air movement in and out of each of the plurality of air cells 20, 24, 80, 84. The valves 28, 30, 140, 142 may open and close under specific pressure conditions as further described below. The valves 28, 30, 140, 142 may alternatively be manually or automatically controlled and operable between an open position and a closed position.

Each valve 28, 30, 140, 142 may be fluidly coupled with the respective plurality of air cells 20, 24, 80, 84 to allow air to pass into and out of the air cells 34 of the plurality of air cells 20, 24, 80, 84. Each of the valves 28, 30, 140, 142 may be a two-way valve configured to allow air to flow in and out of the respective plurality of air cells 20, 24, 80, 84. Each valve 28, 30, 140, 142 may be coupled with the inlet line 120 and the outlet line 124, or the primary line 120, of one of the air cells 34 of the respective plurality of air cells 20, 24, 80, 84. The valves 28, 30, 140, 142 may be configured to draw air for the air cells 34 from ambient surroundings, or the air may be supplied from a tank or compressor. Where the first valve 28 is coupled with the first plurality of air cells 20, the first valve 28 may further be coupled with the first thigh cell 22 to control air movement in and out of the first thigh cell 22 and other air cells 34 of the first plurality of air cells 20 simultaneously. Likewise, where the second valve 30 is coupled with the second plurality of air cells 24, the second valve 30 may further be coupled with the second thigh cell 26 to control air movement in and out of the second thigh cell 26 and other air cells 34 of the second plurality of air cells 24 simultaneously.

Referring now to FIGS. 4A, 4B, and 6, the interior cavity 104 of the air cell 34 may experience a first pressure $P_1$. When the valve 28, 30, 140, 142 is open and there is no external pressure $P_E$ applied to the air cell 34, air may flow into the air cell 34 through the inlet line 120 until the first pressure $P_1$ is substantially equivalent to an ambient pressure $P_A$ or until the valve 28, 30, 140, 142 is closed. When external pressure $P_E$ is applied to the air cell 34, such as from an occupant, the first pressure $P_1$ may be greater than the ambient pressure $P_A$. When the valve 28, 30, 140, 142 is opened, air may flow from the air cell 34 through the outlet line 124 until the first pressure $P_1$ is again substantially equivalent to the ambient pressure $P_A$. In some examples, the valves 28, 30, 140, 142 may be configured to automatically close when the first pressure $P_1$ is substantially equivalent to the ambient pressure $P_A$.

Referring now to FIGS. 7A and 7B, each of the plurality of air cells 20, 24, 80, 84 may include an inlet valve 166, 168, 170, 172 and an outlet valve 176, 178, 180, 182, respectively. Each of the inlet valves 166, 168, 170, 172 and the outlet valves 176, 178, 180, 182 may be a three-way valve. A pump 150, 152, 154, 156 may be positioned proximate the plurality of air cells 20, 24, 80, 84. The pump 150, 152, 154, 156 may be positioned proximate the air cell assembly 18 and may be manually or automatically controlled. Each pump 150, 152, 154, 156 may be individually coupled with a respective plurality of air cells 20, 24, 80, 84. It is contemplated that one pump 150 may be used for the entire air cell assembly 18. It is also contemplated that the pumps 150, 152, 154, 156 may be used for a single vehicle seating assembly 10 or that the pumps 150, 152, 154, 156 may be used for multiple vehicle seating assemblies 10.

Each pump 150, 152, 154, 156 may include a first connecting line 160 and a second connecting line 162. Each of the first connecting lines 160 may be coupled with an inlet valve 166, 168, 170, 172 of the respective plurality of air cells 20, 24, 80, 84. Each of the second connecting lines 162 may be coupled with an outlet valve 176, 178, 180, 182 of the respective plurality of air cells 20, 24, 80, 84. When the pump 150, 152, 154, 156 is applying pressure, or providing air flow, to the respective plurality of air cells 20, 24, 80, 84, the inlet valve 166, 168, 170, 172 coupled with the pump 150, 152, 154, 156 may be opened to allow airflow into the pump 150, 152, 154, 156, as illustrated by arrow A. Likewise, the outlet valve 176, 178, 180, 182 may be opened to allow airflow from the pump 150, 152, 154, 156 and through the inlet line 120 of an air cell 34 of the respective plurality of air cells 20, 24, 80, 84, as illustrate by arrow B. The airflow provides for inflation of the air cells 34 of the plurality of air cells 20, 24, 80, 84. Similarly, when the pump 150, 152, 154, 156 is applying suction to, or pulling air from, the respective plurality of air cells 20, 24, 80, 84, the inlet valve 166, 168, 170, 172 coupled with the pump 150, 152, 154, 156 may be opened to allow airflow from the outlet line 124 of an air cell 34 of the respective plurality of air cells 20, 24, 80, 84 to the pump 150, 152, 154, 156, as illustrated by arrow C. Likewise, the outlet valve 176, 178, 180, 182 may be opened to allow airflow from the pump 150, 152, 154, 156 and out of the respective plurality of air cells 20, 24, 80, 84 as illustrated by arrow D. The airflow provides for deflation of the air cells 34 of the plurality of air cells 20, 24, 80, 84.

Figure 8:
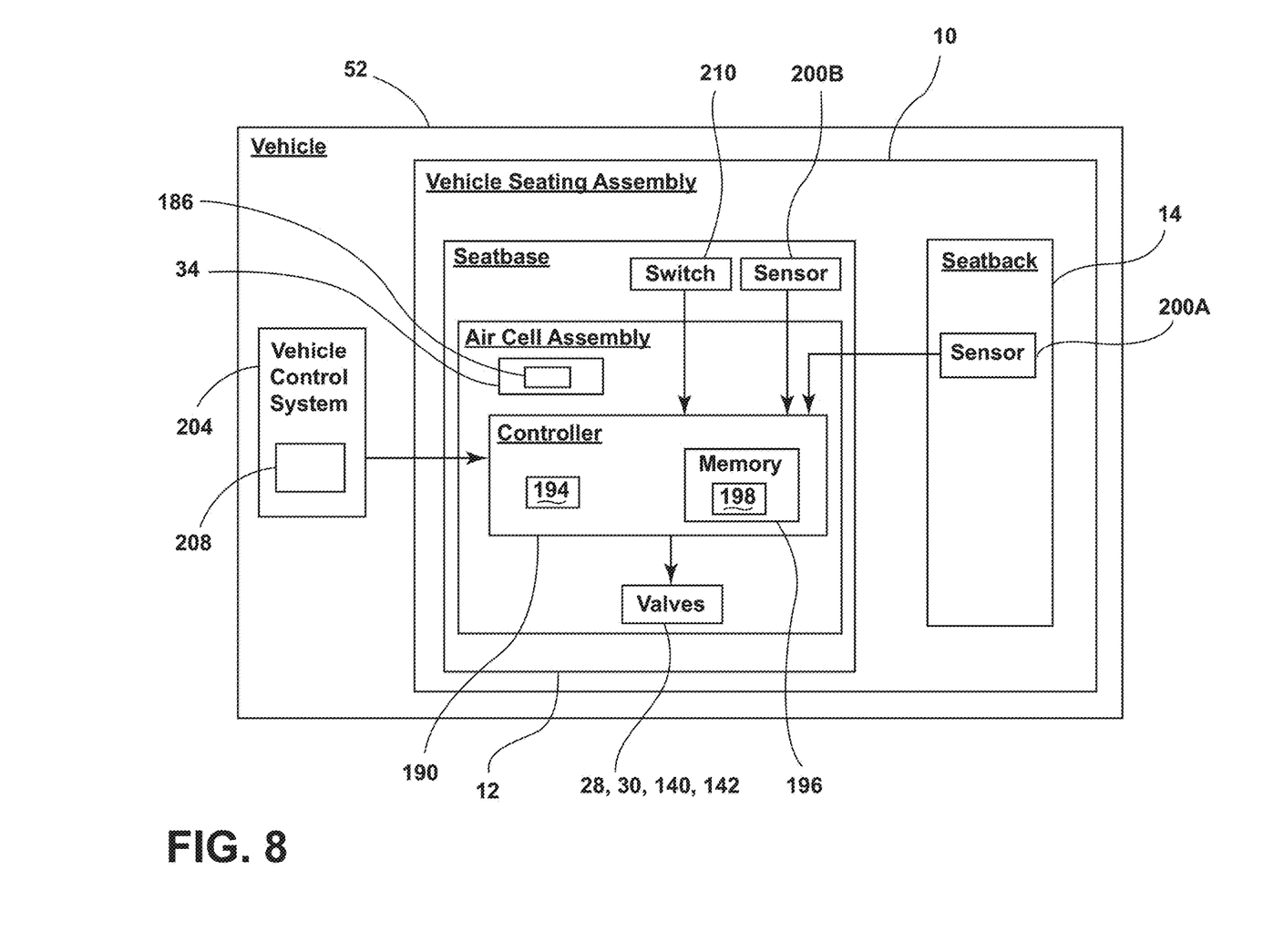
FIG. 8 is a schematic diagram of a vehicle including the air cell assembly of FIG. 6.

Referring now to FIGS. 6 and 8, the air cell assembly 18 may include a controller 190 which is operably coupled to one or more of the valves 28, 30, 140, 142 to provide electronically controlled opening and closing of the valves 28, 30, 140, 142 to control inflation and deflation of the plurality of air cells 20, 24, 80, 84. The controller 190 may be coupled to an input (e.g., a switch 210, a user interface 208 of a vehicle control system 204, a sensor 200A, 200B, etc.). In use, the input provides information to the controller 190 regarding a selected state for the plurality of air cells 20, 24, 80, 84. The controller 190 may include control circuitry, such as a microprocessor 194 and a memory 196. The controller 190 may provide control outputs to the valves 28, 30, 140, 142 according to a routine 198 stored within the memory 196. The control outputs may determine the condition of the valves 28, 30, 140, 142 (e.g., open or closed). In various examples, the routines 198 may be stored based on previous occupant preferences. The routines 198 may be associated with a predetermined time for inflating or deflating the air cells 34 of the air cell assembly 18. Alternatively, a pressure sensor 186 may be used to determine when the first pressure $P_1$ of the air cell 34 reaches a selected valve or to determine when the first pressure $P_1$ is substantially equivalent to the ambient pressure $P_A$, as discussed elsewhere herein. It will be understood that each valve 28, 30, 140, 142 may have a separate controller 190 or one controller 190 may be used for all of the valves 28, 30, 140, 142 without departing from the scope of the present disclosure.

Figure 9:
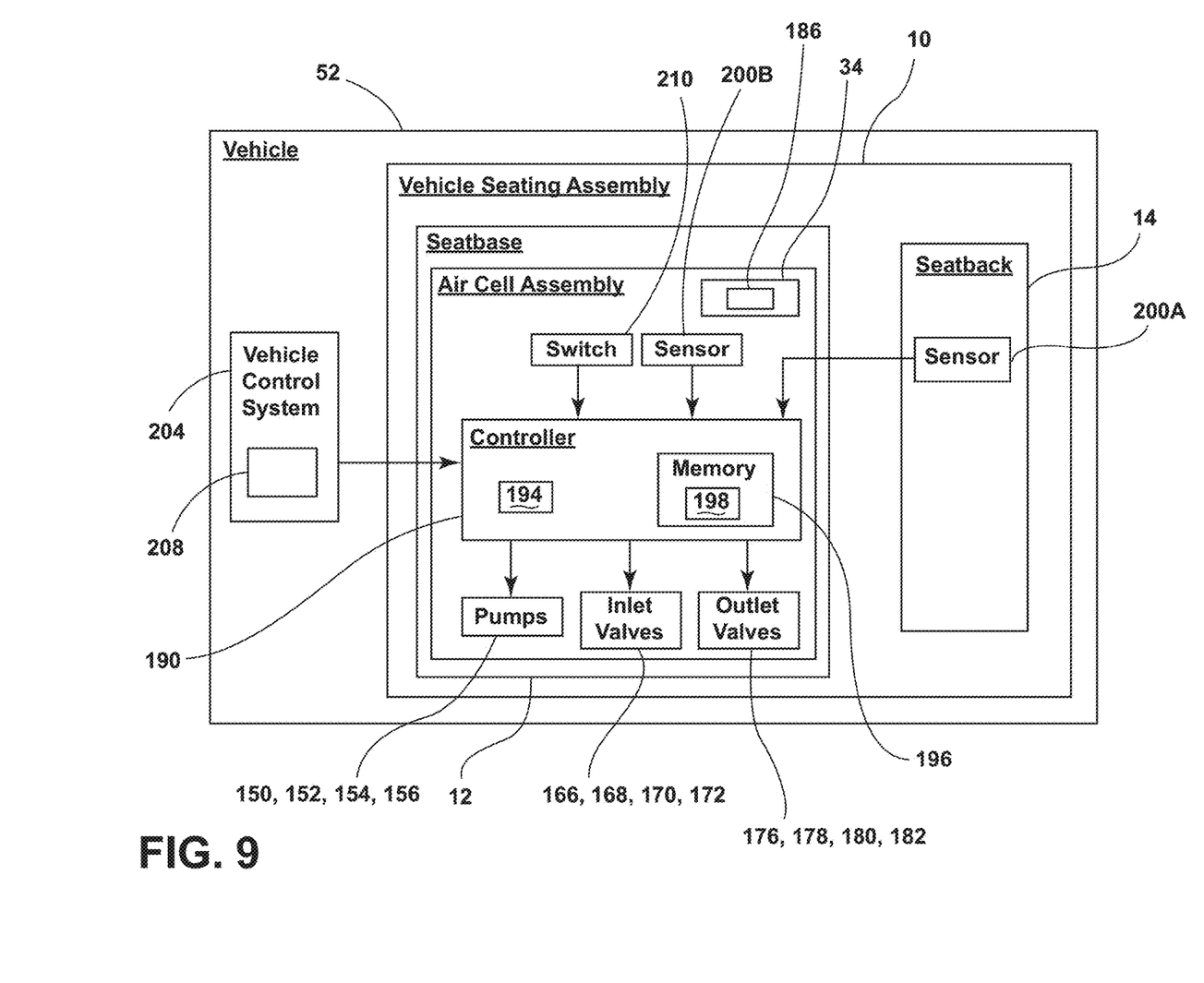
FIG. 9 is a schematic diagram of a vehicle including the air cell assembly of FIGS. 7A and 7B.

Referring now to FIGS. 7A, 7B, and 9, the air cell assembly 18 may include the controller 190 which is operably coupled to one or more of the pumps 150, 152, 154, 156 and the corresponding valves 166, 168, 170, 172, 176, 178, 180, 182 to provide electronically controlled activation of the pressure and/or suction features of the pump 150, 152, 154, 156 and/or opening and closing of the valves 166, 168, 170, 172, 176, 178, 180, 182 to control inflation and deflation of the plurality of air cells 20, 24, 80, 84. The controller 190 may be coupled to the input (e.g., a switch 210, a user interface 208 of a vehicle control system 204, a sensor 200A, 200B, etc.). In use, the input provides information to the controller 190 regarding a selected state for the plurality of air cells 20, 24, 80, 84. The controller 190 may include control circuitry, such as the microprocessor 194 and the memory 196. The controller 190 may provide control outputs to the valves 166, 168, 170, 172, 176, 178, 180, 182 according to a routine 198 stored within the memory 196. The control outputs may determine the condition of the valves 166, 168, 170, 172, 176, 178, 180, 182. Additionally, when inflation or deflation of the plurality of air cells 20, 24, 80, 84 is needed to achieve a selected state, the controller 190 may initiate an inflation sequence or a deflation sequence, respectively. The controller 190 sends an inflation or deflation signal to the pump 150, 152, 154, 156 for inflating or deflating the air cells 34 of the respective plurality of air cells 20, 24, 80, 84. In various examples, the routines 198 may be stored based on previous occupant preferences. The routines 198 may be associated with a predetermined time for inflating or deflating the air cells 34 of the air cell assembly 18. Alternatively, a pressure sensor 186 may be used to determine when the first pressure $P_1$ of the air cell 34 reaches a selected valve or to determine when the first pressure $P_1$ is substantially equivalent to the ambient pressure $P_A$, as discussed elsewhere herein. It will be understood that each valve 28, 30, 140, 142 may have a separate controller 190 or one controller 190 may be used for all of the valves 28, 30, 140, 142 without departing from the scope of the present disclosure.

The vehicle seating assembly 10 may include one or more sensors 200A, 200B. In various examples, the sensor 200A may be positioned on the headrest assembly 56 and may be configured to detect a height of an occupant. In other examples, the sensor 200B may be positioned within the seat base 12 and may be configured to detect a weight of an occupant. In still other examples, a first sensor 200A may be positioned on or within the headrest assembly 56 to detect the height of an occupant while a second sensor 200B may be positioned within the seat base 12 to detect the weight of the occupant. The sensor 200A, 200B may provide input to the controller 190 to determine the appropriate routine 198 for inflating or deflating the plurality of air cells 20, 24, 80, 84 based on the occupant.

Referring to FIGS. 1-9, the vehicle seating assembly 10 may be movable between a first condition (FIGS. 3A, 4A, and 5A) and a second condition (FIGS. 3B, 4B, and 5B) and may stabilize at any condition therebetween. In the first condition, the air cells 34 of the plurality of air cells 20, 24, 80, 84 may be expanded to accommodate an occupant of a first size. For example, in the first condition, the seating assembly 10 may be configured to accommodate the 95$^{th}$ percentile male. In the second condition, the air cells 34 of the plurality of air cells 20, 24, 80, 84 may be contracted to accommodate an occupant of a second size. For example, the second condition, the seating assembly 10 may be configured to accommodate the 5$^{th}$ percentile female. It will be understood that the seating assembly 10 may be movable into a condition between the first and second condition, as discussed elsewhere herein.

An occupant will generally experience the vehicle seating assembly 10 in three stages. Initially, the occupant will approach the vehicle 52 and see the seating assembly 10 in a neutral state. The neutral state may be selected as a design state. For example, the neutral state may be selected to accommodate the 50$^{th}$ percentile male. As the occupant enters the vehicle 52 and sits on the seat base 12 of the seating assembly 10, the occupant will not, at this time, be at the correct restraint or head clearance position. The air cell assembly 18 will then inflate or contract to accommodate the occupant based on input from the sensors 200A, 200B, as discussed elsewhere herein. Stated differently, when the air cell assembly 18 adjusts, the designed h-point H in the vehicle seating assembly 10 is now aligned with the h-point H of the occupant. When the occupant leaves the seating assembly 10 and the seating assembly 10 is unoccupied, the air cell assembly 18 may inflate to the design or neutral state. The adjustable states allow for proper positioning of the occupant's h-point H despite variations of height and weight between occupants. Additionally, the adjustable states further allow for more comfortable seating for the occupant.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:
1. A seating assembly comprising:
a seat base operably coupled with a seatback;
an air cell assembly positioned within the seat base, the air cell assembly comprising:
a first plurality of air cells including a first thigh cell;
a second plurality of air cells including a second thigh cell;

a first valve operably coupled with the first plurality of air cells; and
a second valve operably coupled with the second plurality of air cells, wherein each of the first and second valves is configured to control airflow to and from the first and second plurality of air cells, respectively; and
a cable operably coupled to the first thigh cell and operably coupled with the seatback, the cable configured to selectively compress the first thigh cell.

2. The seating assembly of claim 1, wherein the first and second plurality of air cells are each movable between an expanded state and a contracted state.

3. The seating assembly of claim 2, wherein the first and second plurality of air cells include a fill material configured to bias the first and second plurality of air cells in the expanded state.

4. The seating assembly of claim 1, wherein the seatback is operable between a raised position and a lowered position, and further wherein the cable biases the first thigh cell in a contracted state when the seatback is in the lowered position.

5. The seating assembly of claim 1, wherein the first and second valves are coupled with the first and second plurality of air cells, respectively, by inlet tubes and exhaust tubes.

6. The seating assembly of claim 2, wherein the first and second valves are in an open position when air cells of the first and second plurality of air cells move from the expanded state to the contracted state, and further wherein the first and second valves prevent airflow from the first and second plurality of air cells when the first and second valves are in a closed position.

7. A seating assembly comprising:
a seat base operably coupled with a seatback; and
an air cell assembly positioned within the seat base, the air cell assembly comprising:
  a plurality of air cells including a thigh cell;
  a valve operably coupled with the plurality of air cells;
  a pump operably coupled with the plurality of air cells and the valve, wherein the valve is configured to control airflow from the pump to and from the plurality of air cells, and wherein the plurality of air cells includes a fill material configured to bias each of the plurality of air cells in an expanded state; and
  a controller configured to detect an occupant and actuate the pump.

8. The seating assembly of claim 7, wherein the valve is a three-way valve, and further wherein the pump is configured to provide airflow to and from the plurality of air cells through the valve.

9. The seating assembly of claim 8, wherein airflow is inhibited when the valve is closed.

10. The seating assembly of claim 7, wherein the plurality of air cells is one of multiple pluralities of air cells, and further wherein each of the multiple pluralities of air cells is independently expanded and contracted.

11. The seating assembly of claim 7, further comprising:
a sensor configured to determine a height of a vehicle occupant, wherein the sensor provides input to the controller for providing a routine to the pump and valve for adjusting inflation of the plurality of air cells.

12. The seating assembly of claim 7, further comprising:
a switch positioned proximate the seat base and configured to provide input to the controller for providing a routine to the pump and valve for adjusting inflation of the plurality of air cells.

13. A seating assembly comprising:
a seat base operably coupled with a seatback;
a first plurality of air cells positioned within the seat base;
a second plurality of air cells positioned within the seat base, wherein each of the first plurality of air cells and the second plurality of air cells is movable between an expanded state and a contracted state;
a first valve operably coupled with the first plurality of air cells;
a second valve operably coupled with the second plurality of air cells, wherein each of the first and second valves is configured to control airflow to and from the first and second plurality of air cells, respectively;
a first pump operably coupled with the first valve and configured to provide inflow and outflow of air through the first valve; and
a second pump operably coupled with the second valve and configured to provide inflow and outflow of air through the second valve.

14. The seating assembly of claim 13, wherein each of the first and second valves is operably coupled within an inlet and exhaust of one of the first and second plurality of air cells, respectively.

15. The seating assembly of claim 13, further comprising:
a controller operably coupled with one of the first valve and the second valve;
a sensor configured to determine a size of an occupant, wherein the sensor provides input to the controller for providing a routine to the respective valve for allowing inflation of the plurality of air cells.

16. The seating assembly of claim 13, further comprising:
a controller operably coupled with one of the first valve and the second valve;
a switch positioned proximate the seat base, wherein the switch provides input to the controller for providing a routine to the respective valve for allowing inflation of the plurality of air cells.

17. The seating assembly of claim 13, wherein each air cell of the first and second plurality of air cells includes a self-expanding fill material configured to bias each air cell in the expanded state.

18. The seating assembly of claim 17, wherein a weight of an occupant provides an external pressure to compress the fill material and expel air from the respective air cell.

\* \* \* \* \*